United States Patent
Kimura

(10) Patent No.: US 8,954,259 B2
(45) Date of Patent: Feb. 10, 2015

(54) CONTROL DEVICE AND CONTROL METHOD FOR VEHICLE

(75) Inventor: Kenji Kimura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 239 days.

(21) Appl. No.: 13/556,474

(22) Filed: Jul. 24, 2012

(65) Prior Publication Data

US 2013/0030673 A1 Jan. 31, 2013

(30) Foreign Application Priority Data

Jul. 27, 2011 (JP) ................. 2011-164453

(51) Int. Cl.
| | |
|---|---|
| *F02D 29/02* | (2006.01) |
| *F02D 11/10* | (2006.01) |
| *F02D 45/00* | (2006.01) |
| *B60K 28/10* | (2006.01) |
| *F02D 41/22* | (2006.01) |
| *F02D 41/06* | (2006.01) |

(52) U.S. Cl.
CPC ............. *F02D 11/105* (2013.01); *F02D 45/00* (2013.01); *F02D 29/02* (2013.01); *F02D 41/22* (2013.01); *B60K 28/10* (2013.01); *F02D 41/062* (2013.01); *F02D 2200/501* (2013.01); *F02D 2200/602* (2013.01); *F02D 2250/26* (2013.01)
USPC .......................................... 701/110; 123/492

(58) Field of Classification Search
USPC ................ 701/110, 112, 113, 70, 76, 79, 54; 123/491, 492, 690
See application file for complete search history.

(56) References Cited

U.S. PATENT DOCUMENTS

| | | | | | |
|---|---|---|---|---|---|
| 5,091,854 | A | * | 2/1992 | Yoshimura et al. | ............ 701/101 |
| 5,818,116 | A | * | 10/1998 | Nakae et al. | ................ 290/38 R |
| 6,311,116 | B1 | | 10/2001 | Lee | |

FOREIGN PATENT DOCUMENTS

| | | |
|---|---|---|
| JP | 61-190135 A | 8/1986 |
| JP | 2001171393 A | 6/2001 |
| JP | 2010261346 A | 11/2010 |

* cited by examiner

*Primary Examiner* — Mahmoud Gimie
(74) *Attorney, Agent, or Firm* — Gifford, Krass, Sprinkle, Anderson & Citkowski, P.C.

(57) ABSTRACT

An electronic control unit executes torque suppression control for reducing engine torque at the time of strong accelerator operation on the basis of an execution condition that a period of time elapsed from when an ignition switch is turned on is shorter than a prescribed period of time. By so doing, the torque suppression control is executed only when the elapsed period of time is short, a vehicle is still running in a parking lot and it is less likely that a driver performs accelerator operation with the intention to suddenly accelerate the vehicle; whereas, when the elapsed period of time is longer than a certain period of time and the vehicle is presumably running on an ordinary road, the torque suppression control is not executed, and acceleration of the vehicle along with the driver's intention is allowed.

11 Claims, 2 Drawing Sheets

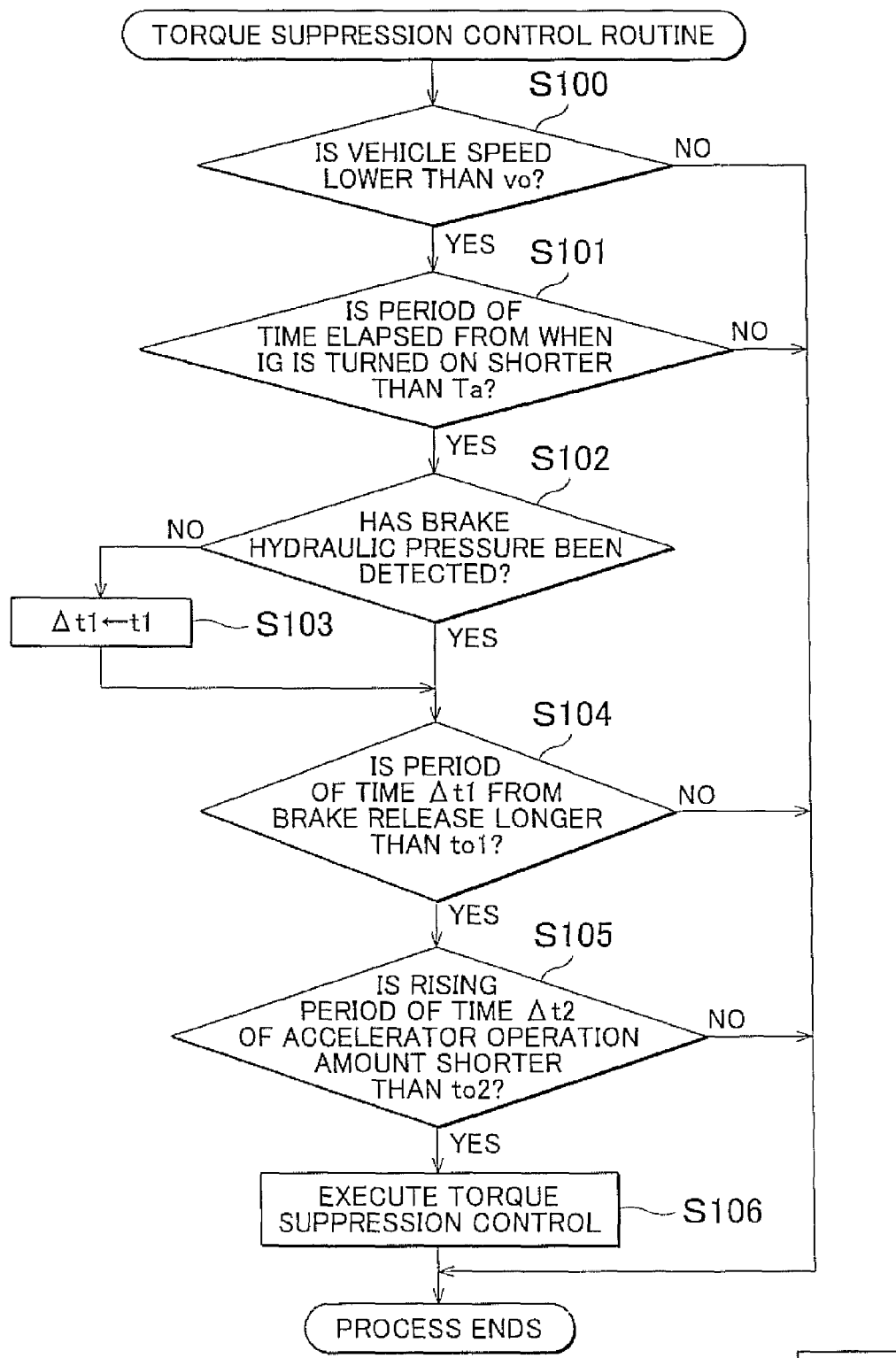

CONTROL DEVICE AND CONTROL METHOD FOR VEHICLE

INCORPORATION BY REFERENCE

This application claims priority to Japanese Patent Application No. 2011-164453 filed on Jul. 27, 2011, which is incorporated herein by reference in its entirety including the specification, drawings and abstract.

BACKGROUND OF THE INVENTION

1. Field of the Invention

The invention relates to a control device and control method for a vehicle, which execute torque suppression control for reducing torque generated by a driving source when an accelerator operation is greater (i.e., stronger or larger) than a predetermined value.

2. Description of Related Art

In an existing art, Japanese Patent Application Publication No. 61-190135 (JP 61-190135 A) describes a technique for executing torque suppression control. In the torque suppression control, engine torque is reduced when the gear ratio of a transmission is high, the depression force of an accelerator pedal is large and the depression speed of the accelerator pedal is high.

Incidentally, as in the case at the time of moving a vehicle from a state where the vehicle is stopped at a red light at an intersection, a driver may strongly depress an accelerator pedal with the driver's intention to suddenly accelerate the vehicle. In this respect, in the above existing art, engine torque is similarly reduced in such a case as well, so it may be difficult to accelerate the vehicle along with the driver's intention. This deteriorates drivability.

SUMMARY OF THE INVENTION

The invention provides a control device and control method for a vehicle, which suppress a reduction in torque against a driver's intention to accelerate the vehicle to thereby make it possible to suppress deterioration of drivability.

A first aspect of the invention relates to a control device for a vehicle, which executes torque suppression control for reducing torque generated by a driving source when an accelerator operation is greater (i.e., stronger or larger) than a predetermined value. The control device includes a control mode change unit that changes a control mode of the torque suppression control on the basis of a period of time elapsed from when an ignition switch is turned on.

For a while after the ignition switch is turned on, the vehicle is running in a parking lot, so it is presumably less likely that a driver intends to suddenly accelerate the vehicle. On the other hand, after a lapse of a certain period of time from when the ignition switch is turned on, the vehicle is presumably running on an ordinary road, so, in such a situation, the driver may perform accelerator operation with the intention to suddenly accelerate the vehicle. In this way, whether the driver performs accelerator operation with the intention to suddenly accelerate the vehicle may be determined to some degree on the basis of the period of time elapsed from when the ignition switch is turned on. In this respect, with the above configuration, the control mode of the torque suppression control is changed on the basis of a period of time elapsed from when the ignition switch is turned on. Therefore, in consideration of whether the driver performs accelerator operation with the intention to suddenly accelerate the vehicle, the control mode of the torque suppression control, such as an amount of torque reduced through the torque suppression control and an execution condition for the torque suppression control, may be set. Therefore, it is possible to suppress a reduction in torque against the driver's intention to accelerate the vehicle and suppress deterioration of drivability.

As described above, for a while after the ignition switch is turned on, the vehicle is running in a parking lot, so it is presumably less likely that the driver intends to suddenly accelerate the vehicle. Therefore, even when torque is significantly reduced through the torque suppression control during then, the driver's intention to accelerate the vehicle is not impaired, so drivability is not deteriorated. Thus, in the above aspect, the control mode change unit may reduce an amount of the torque reduced through the torque suppression control as the elapsed period of time extends. In addition, in the above aspect, the control mode change unit may set a fact that the elapsed period of time is shorter than a prescribed period of time as an execution condition for the torque suppression control. By so doing, it is possible to suppress a reduction in torque against the driver's intention to accelerate the vehicle.

In addition, by changing an execution condition for the torque suppression control as well, a reduction in torque through the torque suppression control may be suppressed. Therefore, in the above aspect, the control mode change unit may change an execution condition for the torque suppression control on the basis of the elapsed period of time. By so doing as well, it is possible to suppress a reduction in torque against the driver's intention to accelerate the vehicle. For example, in the above aspect, the control mode change unit may change an execution condition for the torque suppression control so as to become harder to execute the torque suppression control as the period of time elapsed from when the ignition switch is turned on extends. By so doing, the torque suppression control may be actively executed while the vehicle is still running in a parking lot, and it may become harder to execute the torque suppression control after the vehicle starts running on an ordinary road.

A second aspect of the invention relates to a control method for a vehicle, which executes torque suppression control for reducing torque generated by a driving source when an accelerator operation is greater (i.e., stronger or larger) than a predetermined value. The control method includes changing a control mode of the torque suppression control on the basis of a period of time elapsed from when an ignition switch is turned on.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 3 is a flow chart of torque suppression control routine applied to the embodiment.

DETAILED DESCRIPTION OF EMBODIMENTS

Figure 1:
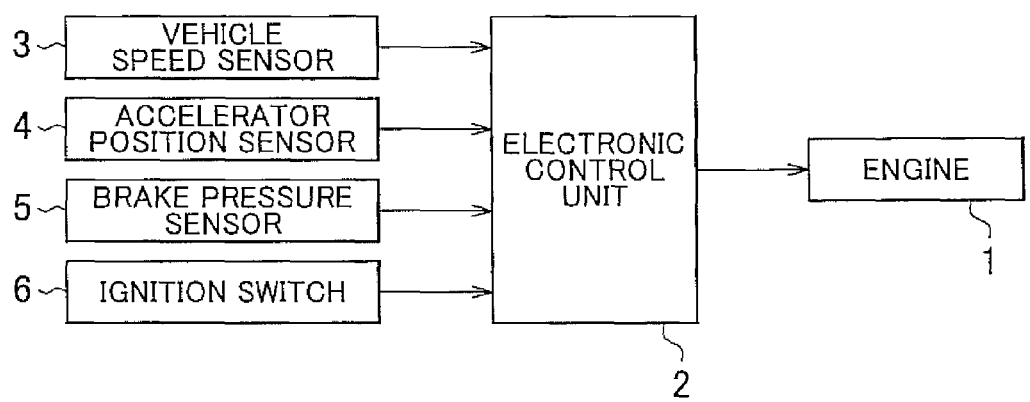
FIG. 1 is a schematic diagram that schematically shows the configuration of a control device for a vehicle according to an embodiment of the invention.
Figure 2:
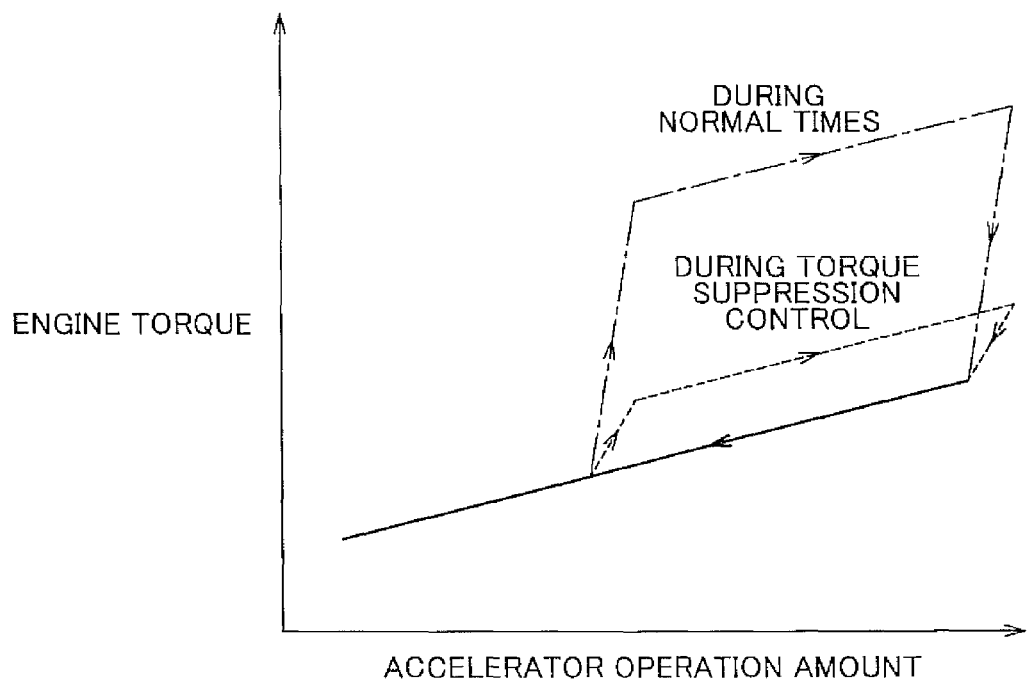
FIG. 2 is a graph that shows the correlation between an accelerator operation amount and an engine torque during normal times and the correlation between an accelerator operation amount and an engine torque during torque suppression control in the control device for a vehicle according to the embodiment.

Hereinafter, a specific embodiment of the control device for a vehicle according to the aspect of the invention will be described in detail with reference to FIG. 1 to FIG. 3. First, the configuration of the control device for a vehicle according to the embodiment will be described with reference to FIG. 1. As shown in the drawing, the control device for a vehicle according to the present embodiment is mainly formed of an electronic control unit 2 that governs control over an engine 1 that is the driving source of the vehicle. The electronic control unit 2 includes a central processing unit (CPU), a read only memory (ROM) and a random access memory (RAM). The CPU executes various computations for engine control. The ROM stores programs and data for engine control. The RAM temporarily stores results computed by the CPU, results detected by sensors, and the like. A vehicle speed sensor 3, an accelerator position sensor 4, a brake pressure sensor 5 and an ignition switch 6 are connected to the thus configured electronic control unit 2. The vehicle speed sensor 3 detects a vehicle speed. The accelerator position sensor 4 detects an accelerator operation amount. The brake pressure sensor 5 detects a brake hydraulic pressure. The ignition switch 6 is tuned on when the vehicle is started up.

The electronic control unit 2 executes torque suppression control as part of engine control. The torque suppression control is control for reducing engine torque as compared with that during normal times. A reduction in engine torque through the torque suppression control is, for example, carried out by decreasing the throttle opening degree of the engine 1 or reducing the fuel injection amount of the engine 1. Specifically, as shown in FIG. 2, an engine torque is reduced during torque suppression control as compared with an engine torque during normal times when the accelerator is depressed in a state where the accelerator operation amount is larger than or equal to a set amount.

In the present embodiment, torque suppression control is executed in response to a situation that all the following conditions (A) to (D) are satisfied.
(A) The vehicle speed is lower than a prescribed value vo.
(B) A period of time elapsed from when the ignition switch 6 is turned on is shorter than a prescribed period of time Ta.
(C) A period of time $\Delta t1$ from when the brake is released (brake hydraulic pressure is decreased) is longer than a prescribed value to1. That is, it is not an accelerator operation for starting the vehicle immediately after the brake is released.
(D) A rising period of time $\Delta t2$ of the accelerator operation amount is shorter than a prescribed period of time to2, and sudden accelerator operation, that is, strong accelerator operation, is performed. Note that the rising period of time $\Delta t2$ of the accelerator operation amount is a period of time from when an increase in the accelerator operation amount begins to when the increase in the accelerator operation amount ends.

The above torque suppression control is executed through the process of torque suppression control routine shown in FIG. 3. The process of the routine is repeatedly executed by the electronic control unit 2 at prescribed control cycles.

When the routine is started, it is initially determined in step S100 whether the vehicle speed is lower than the prescribed value vo. Here, when the vehicle speed is higher than or equal to the prescribed value vo (NO in S100), the process of the current routine directly ends.

When the vehicle speed is lower than the prescribed value vo (YES in S100), it is determined in step S101 whether the period of time elapsed from when the ignition switch 6 is turned on is shorter than the prescribed period of time Ta. Here, when the elapsed period of time is longer than or equal to the prescribed period of time Ta (NO in S101), the process of the current routine directly ends.

When the elapsed period of time is shorter than the prescribed period of time Ta (YES in S101), it is checked in step S102 whether brake hydraulic pressure has been detected, that is, whether brake operation is being performed. Here, when no brake hydraulic pressure has been detected (NO in S102), a constant t1 is set for the period of time $\Delta t1$ from brake release in step S103, and then the process proceeds to step S104. On the other hand, when brake hydraulic pressure has been detected (YES in S102), the process directly proceeds to step S104.

When the process proceeds to step S104, it is determined in step S104 whether the period of time $\Delta t1$ after brake release is longer than the prescribed value to1. Here, the prescribed value to1 is set at a value longer than "0" and shorter than the constant t1. Then, when the period of time $\Delta t1$ after brake release is shorter than or equal to the prescribed value to1 (NO in S104), the process of the current routine directly ends.

On the other hand, when the period of time $\Delta t1$ after brake release is longer than the prescribed value to1 (YES in S104), it is determined in step S105 whether the rising period of time $\Delta t2$ of the accelerator operation amount is shorter than the prescribed value to2. Here, when the rising period of time $\Delta t2$ of the accelerator operation amount is longer than or equal to the prescribed period of time to2 (NO in S105), the process of the current routine directly ends. Then, when the rising period of time $\Delta t2$ of the accelerator operation amount is shorter than the prescribed value to2 and sudden accelerator operation has been performed (YES in S105), torque suppression control is executed in step S106.

Next, the operation of the thus configured control device for a vehicle according to the present embodiment will be described. For a while after the ignition switch 6 is turned on, the vehicle is running in a parking lot, so it is presumably less likely that a driver intends to suddenly accelerate the vehicle. On the other hand, after a lapse of a certain period of time from when the ignition switch 6 is turned on, the vehicle is presumably running on an ordinary road, so, in such a situation, the driver may perform accelerator operation with the intention to suddenly accelerate the vehicle. In this respect, in the present embodiment, torque suppression control is executed when the period of time elapsed from when the ignition switch 6 is turned on is shorter than the prescribed period of time Ta. Therefore, even when engine torque is reduced through torque suppression control during then, the driver's intention to accelerate the vehicle is not impaired, so drivability is not deteriorated. On the other hand, after the vehicle starts running on an ordinary road, even when strong accelerator operation is performed, torque suppression control is not executed, so acceleration of the vehicle along with the driver's intention is allowed. Thus, the vehicle may be moved from a state where the vehicle is stopped at a red light at an intersection without slow response.

With the control device for a vehicle according to the above embodiment, the following advantageous effects may be obtained.
(1) In the present embodiment, the fact that the period of time elapsed from when the ignition switch 6 is turned on is shorter than the prescribed period of time Ta is used as the execution condition for torque suppression control. Thus, according to the present embodiment, it is possible to suppress a reduction in torque against the driver's intention to accelerate the vehicle and suppress deterioration of drivability.

Note that the above described embodiment may be modified into the following alternative embodiments.
In the above embodiment, fulfillment of all the above described conditions (A) to (D) is used as the execution condition for torque suppression control; instead, as long as the fact that the period of time elapsed from when the ignition switch 6 is turned on is shorter than the prescribed period of time Ta is included in the execution condition, the execution condition may be changed where appropriate.

In the above embodiment, whether to execute torque suppression control is determined on the basis of the prescribed period of time Ta as a boundary; instead, the amount of engine torque reduced through torque suppression control may be reduced as the period of time elapsed from the ignition switch 6 is turned on extends. In this case as well, when the elapsed period of time is short, significant reduction in engine torque is performed through torque suppression control; however, it is less likely that the driver performs strong accelerator operation with the driver's intention to suddenly accelerate the vehicle at this time. Therefore, even when significant reduction in engine torque is performed, the driver's intention to accelerate the vehicle is not impaired. On the other hand, when the period of time elapsed from when the ignition switch 6 is turned on is long, the amount of engine torque reduced through torque suppression control is small, and certain acceleration is allowed. Therefore, acceleration along with the driver's intention is allowed. Thus, in this case as well, it is possible to suppress reduction in a torque against the driver's intention to accelerate the vehicle and suppress deterioration of drivability.

In the above embodiment, it is checked whether strong accelerator operation has been performed on the basis of whether the rising period of time Δt2 of the accelerator operation amount is shorter than the prescribed value to2, and then torque suppression control is executed. Of course, strong accelerator operation may be checked on the basis of an accelerator operation force (depression force on the accelerator pedal) or an accelerator operation speed (depression speed of the accelerator pedal). In addition, torque suppression control may be executed on the basis of large accelerator operation, that is, the fact that the accelerator operation amount is larger than a prescribed value.

Second Embodiment

Next, a specific second embodiment of the control device for a vehicle according to the aspect of the invention will be described. Note that, in the present embodiment, like reference numerals denote the same components as those of the above described embodiment, and the description thereof is omitted.

In the present embodiment, the execution condition for torque suppression control is changed on the basis of the period of time elapsed from when the ignition switch 6 is turned on. The execution condition is changed so as to become harder to execute torque suppression control as the elapsed period of time extends.

For example, when the fact that the rising period of time Δt2 of the accelerator operation amount is shorter than the prescribed value to2 is included in the execution condition for torque suppression control, the execution condition may be changed such that the prescribed value to2 is reduced as the period of time elapsed from when the ignition switch 6 is turned on extends to thereby make it hard for torque suppression control to be executed.

In addition, it is conceivable that the fact that the accelerator operation amount (the depression amount of the accelerator pedal), the accelerator operation force (the depression force on the accelerator pedal) or the accelerator operation speed (the depression speed of the accelerator pedal) exceeds a prescribed value is included in the execution condition for torque suppression control. In this case, the execution condition may be changed such that the prescribed value is increased as the period of time elapsed from when the ignition switch 6 is turned on extends to make it hard for torque suppression control to be executed.

In the thus configured present embodiment, it becomes harder to execute torque suppression control as the period of time elapsed from when the ignition switch 6 is turned on extends. When the elapsed period of time is short, the vehicle is running in a parking lot, so it is presumably less likely that the driver performs accelerator operation with the intention to suddenly accelerate the vehicle. Therefore, even when torque suppression control is executed to reduce engine torque, the driver's intention to accelerate the vehicle is not impaired. On the other hand, after a lapse of a certain period of time from when the ignition switch 6 is turned on, the vehicle is presumably running on an ordinary road, so, in such a situation, the driver may perform accelerator operation with the intention to suddenly accelerate the vehicle. However, in this case, torque suppression control is executed, so a reduction in engine torque against the driver's intention to accelerate the vehicle is suppressed.

With the control device for a vehicle according to the present embodiment, the following advantageous effects may be obtained.

(1) In the present embodiment, the execution condition for torque suppression control is changed on the basis of the period of time elapsed from when the ignition switch 6 is turned on. Specifically, the execution condition is changed so as to become harder to execute torque suppression control as the elapsed period of time extends. Therefore, it is possible to suppress a reduction in torque against the driver's intention to accelerate the vehicle and suppress deterioration of drivability.

The above described embodiment may be modified into the following alternative embodiment.

In the above described embodiment, torque suppression control is executed by reducing engine torque. Of course, in a hybrid vehicle or an electric vehicle that includes a motor as a driving source, torque suppression control may be executed by reducing torque generated by the motor.

What is claimed is:

1. A control device for a vehicle comprising:
an electronic control unit configured to execute a torque suppression control for reducing torque generated by a driving source when an accelerator operation is greater than a predetermined value,
wherein the electronic control unit executes the torque suppression control when an elapsed time is shorter than a prescribed period of time after an ignition switch is turned on and a period of time from when a brake is released is longer than a prescribed value,
the torque suppression control reduces an amount of the torque reduced as the elapsed period of time extends.

2. The control device according to claim 1, wherein an execution condition for the torque suppression control changes on the basis of the elapsed period of time.

3. The control device according to claim 1, wherein an execution condition for the torque suppression control is changed so as to become harder to execute the torque suppression control as the elapsed period of time extends.

4. The control device according to claim 1, wherein the electronic control unit is configured to change an execution condition for the torque suppression control on the basis of the elapsed period of time.

5. The control device according to claim 1, wherein the electronic control unit is configured to change an execution condition for the torque suppression control so as to become harder to execute the torque suppression control as the elapsed period of time extends.

6. A control method for a vehicle including an electronic control unit, the control method comprising
executing, by the electronic control unit, a torque suppression control for reducing torque generated by a driving source when an accelerator operation is greater than a predetermined value, the torque suppression control is executed when an elapsed time is shorter than a prescribed period of time after an ignition switch is turned on and a period of time from when a brake is released is longer than a prescribed value; and
reducing the amount of the torque reduced as the elapsed period of time extends.

7. The control method according to claim 6, wherein a fact that the elapsed period of time is shorter than a prescribed period of time is set as an execution condition for the torque suppression control.

8. The control method according to claim 6, wherein an execution condition for the torque suppression control is changed on the basis of the elapsed period of time.

9. The control method according to claim 6, wherein an execution condition for the torque suppression control is changed so as to become harder to execute the torque suppression control as the elapsed period of time extends.

10. The control method according to claim 6, wherein the electronic control unit is configured to change an execution condition for the torque suppression control on the basis of the elapsed period of time.

11. The control method according to claim 6, wherein the electronic control unit is configured to change an execution condition for the torque suppression control so as to become harder to execute the torque suppression control as the elapsed period of time extends.

* * * * *